United States Patent [19]

Pauliukonis

[11] 4,033,378

[45] July 5, 1977

[54] COMPRESSED GAS VALVE WITH CONSTANT FLOW

[76] Inventor: Richard S. Pauliukonis, 6660 Greenbriar Drive, Cleveland, Ohio 44130

[22] Filed: Dec. 10, 1973

[21] Appl. No.: 423,546

[52] U.S. Cl. .................... 137/614.19; 137/503; 137/517
[51] Int. Cl.² .................................. F16K 11/10
[58] Field of Search .......... 137/501, 503, 504, 517, 137/557, 614.19, 613

[56] References Cited

UNITED STATES PATENTS

| | | | |
|---|---|---|---|
| 770,913 | 9/1904 | Lord | 137/504 |
| 805,146 | 11/1905 | Lord | 137/504 |
| 873,984 | 12/1907 | Bobrick | 137/557 |
| 886,834 | 5/1908 | Michelin | 137/517 |
| 1,442,140 | 1/1923 | Field | 137/614.19 |
| 2,472,787 | 6/1949 | Brown | 137/504 |
| 2,754,659 | 7/1956 | Dide | 137/517 X |

Primary Examiner—Alan Cohan

[57] ABSTRACT

A pressure reducing valve for use with compressed gas containers requiring fixed volumetric flow at regulated exhaust pressure regardless of pressure variation inside said container changing from initially high pressure value to eventually low final pressure value, consists of a spring loaded metering valve directly responsive to pressure load with a valving element comprising a needle inside control orifice for control of small quantity flow as regulated by relatively long conical stem travel, and a main valve of pin configuration inside valve nozzle exhaust port at one end subjected to pressurized gas for maintaining valve bubble tight shut, and at the other end protruding said exhaust port for valve actuation externally by pin depression for initiation of flow which terminates automatically when such depression is removed rendering valve closed and bubble tight by the pressure action over pin end exposed to compressed gas pressure, including a safety valve with self-locking tapers in valve seats and a pressure gage both conveniently mounted inside the boss of said gas container rendering a simple valving means within the requirements of regulating codes.

2 Claims, 1 Drawing Figure

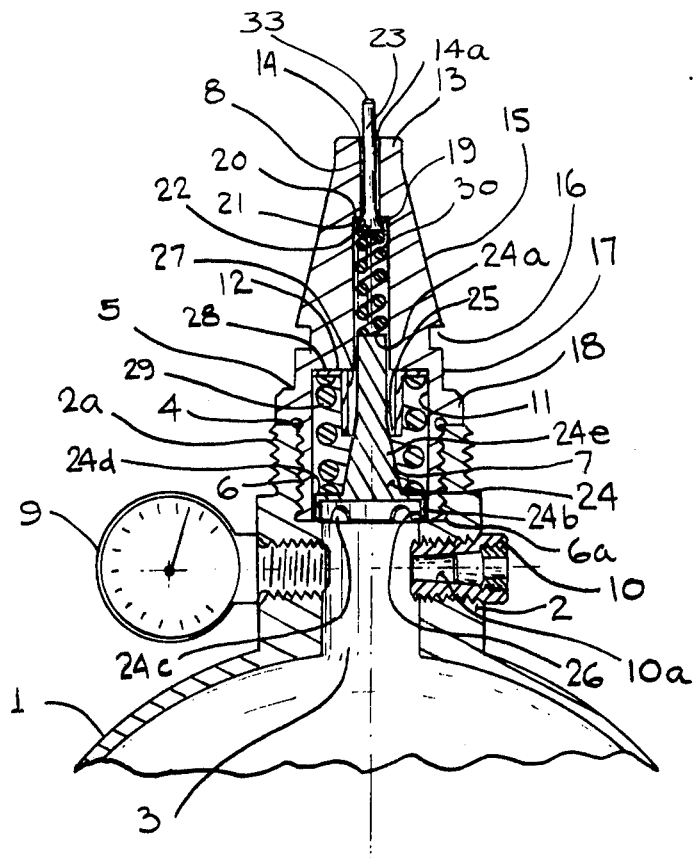

COMPRESSED GAS VALVE WITH CONSTANT FLOW

This invention relates to pressure-reducing regulators used with pressurized containers, and more particularly- to a valving unit for use with compressed gases which exhaust into the atmosphere at a fixed volumetric flow irrespective of the pressure variation in the cylinder or bottle.

The valve elements of such devices and their control must be simple and must pass all regulatory codes governing the safety, the operation and use of compressed gas containers, be it gas cylinder or gas bottle.

Any device which maintains a predetermined upstream, downstream, or differential pressure by means of pressure reducing control element is called pressure regulator. Existing pressure regulators are very complicated, in particular those designed for use in airborne systems. However they are the only type valves that as regulators reduce upstream pressure to a predetermined downstream pressure regardless of upstream pressure variations, and permit regulated exhaust at fixed volumetric flow. They are not only too costly for use in ground systems but their flow rates are too large for practical use with equipment such as that employed with medical gases, in particular with portable emergency units requiring flow rates between 5 to 10 liters per minute.

The growing demand for emergency kits of oxygen supply in compact portable units suitable for immediate application has identified this problem and the lack of a suitable and simple pressure reducing valve. Most of the units presently on the market do not possess the necessary flow control element, and in fact lack on the basic safety equipment as well, and therefore have been subject to various regulatory actions prohibiting their further distribution.

The object of the present invention is to provide a pressure-reducing regulator for use with compressed gases, which is simple and reliable. Further object is to provide a complete package unit which includes a valve for constant flow of compressed gas irrespective of upstream pressure variation inside the compressed gas container be it cylinder or bottle pressurized to 1000 or 5000 psig. but not limited to it.

More specifically, the object of this invention is to provide a simple compressed gas valve with constant flow for use with medical gases such as oxygen in an emergency kit, such kit comprising a portable compressed gas container and a valve unit for quick and easy operation and gas dispensation in case of emergency, including safety devices within the regulatory code requirements.

Devices of this type which require fewer components for valve construction and operation, and which improve ultimate performance of a system are obviously desirable because they are simple, relatively inexpensive and reliable means of providing regulated and fixed volumetric flow.

These and other objects and advantages of the invention will become more fully apparent from the following description of the embodiment of the invention, taken together with the accompanying drawings:

In the drawing we find a cross-sectional view of compressed gas valve mounted inside cylinder boss indentifying valving, pressure-reducing, safety relief and pressure gage.

Shown in the drawing is a section of cylinder housing 1 with a boss 2 permanently secured thereto at one end which is in direct communication with the cylinder by an opening 3 while the other end identified by 4 is open and adaptable to receive a valve housing 5 attached thereto by threads 6 having spring loaded metering needle valve 7 as well as main pin valve 8, including appropriate pressure gage 9 and a pop safety valve 10 permanently secured in the boss 2 and spaced approximately midway of the boss length protruding cylinder housing 1.

The valve housing 5 which at one end is provided with male threads 6a and a large counterbore 11 coaxially entering housing 5 to terminate approximately midway of the housing length with a shoulder 12, at the other end is provided with reduced diameter exhaust nozzle 13 with centrally located a coaxial inwardly proceeding small exhaust opening 14 and an external taper 15, large diameter of which ends with a peripheral groove 16 at the start of a central straight tubular section 17 which terminates with a nut 18 adjacent to male threads 6a.

A third diameter coaxial opening 19 inside valve housing 5 at one end is connected with counterbore 11 forming a shoulder 12 and at the other end is connected with small exhaust opening 14 terminating with another shoulder 20 where the opening 14 starts serving as a seat 21 for head 22 of the pin 23 which at the opposite end of nozzle opening 14 protrudes as shown by pin section 33. Pin 23 inside opening 14 serves as main valving means when inserted via large couterbore during initial valve assembly, and annlus 14a formed therein serves as gas exhaust port means. Counterbore 11 housing the needle valve components indentifies an elongated stem 24 one end of which is provided with a straight reduced diameter section 24a of diameter permitting a close sliding fit inside opening 19 and another end of which is provided with a straight larger diameter section 24b which is skirted and provided with slots 24c, the diameter of section 24b being of close sliding fit to the diameter of counterbore 11, and the length of the larger diameter section is made to be rather short, and sufficient enough to act as a guide when sliding inside counterbore 11 and opening 19 axially in service, in response to the cylinder pressure variation with time. The skirted straight larger diameter section 24b terminates with a flange 24d facing shoulder 12 of counterbore 11 on one side and on the other side having end of skirt resting on shoulder 26 of the bottom of threads 6 of the boss open end 4, is conveniently exposed to cylinder pressure. Midway, between ends 24a and 24b of the stem 24 there is an elongated taper 24e which in the illustrated case enters an orifice 25 of a metering valve nozzle 27 which is provided with a flange 28 of diameter to slidably enter counterbore 11 and to fit against shoulder 12, permanently seated and supported by one end of main spring 29 of which the other end is resting over opposite flange 24d of the metering stem 24. Spring 30 inside central third diameter opening 19 is abutting at one end the stem end 24a and at the other end the pin head 22 with very slight or practically no pressure, but just enough to position pin head 22 adjacent to main valve seat 21 and to insure that only cylinder pressure holds valve shut and sealed and that the spring adds little to the end force required for valve operation in service.

In assembly, the pin 23 with spring 30 are slidably inserted into position first, and then followed by valve nozzle 27, main spring 29 and stem 24 which as such may be preassembled inside valve housing 5 and subsequently secured permanently inside boss 2 by threads 6 resulting in a slight preload of the main valving pin 23, and a substantial preload of the main spring inside 5 counterbore, if need be. The preloading of the main spring 29 will depend on cylinder initial pressures and flow requirements, therefore such spring preload may vary with each application, and may also be only slightly preloaded during the initial steps necessitating addition of a retainer ring (not shown) to the valve housing counterbore for valve housing subassembly to facilitate less complicated final assembly of needle valve to the cylinder.

In operation, first stage will involve cylinder filling and pressurization which can be done by employing quick disconnect where allowed, such quick disconnect fastened by peripheral groove 16 during cylinder filling, or by employing threaded boss end 2a which may be provided with noninterchangeable type threaded connection conforming to the existing codes controlling cylinder charging within safety requirements. After the cylinder was charged with pressurized or compressed gas, the cylinder operation comprises a second stage, namely withdrawal of gas at controlled fixed rates. This occurs when the protruded pin end 33 becomes depressed by external means be it manual, lever, tripper or the like, unseating pin head 22, and instantaneously setting the metering valve into action which follows by depressing automatically the main spring by the action of compressed gas over exposed skirted flange of the stem and closing proportionally the orifice 25 by stem tapered section 24e as well as by the stem end 24a inside opening 19 in accordance with pressure value inside cylinder. As the pressure decreases, the main spring 29 forces retraction of stem taper from the orifice to permit larger flow passage and less pressure drop as well as withdrawal of the stem straight end from the third diameter central valve housing opening with indentical result and with flow rates automatically controlled by valve components this invention provides, completely fullfilling the objectives described. The safety valve means include self-locking tapered cone 10a inside tapered seat of the pop safety valve 10 patented separately This invention is not restricted to the slavish imitation of each and everyone of the details described above which have been set forth merely by way of example with the intent of most clearly setting forth the teachings of the invention. Obviously, devices may be provided which change, eliminate or add certain specific structural or procedural details without departing from the invention.

What is claimed is:
1. A pressure regulating valve comprising:
a valve housing including a first opening means for direct contact with compressed gas at a first housing end and a second opening means for fluid exhaust to the atmosphere at a second housing end, a pressure reducing means in said first opening means slidable from a first neutral position to a second control position regulating fluid flow automatically and in response to the cylinder pressures by means of biasing force means incorporated therein, a main valve means in said second opening means slidable from a first position blocking fluid communication between said first and second opening means to a second position allowing fluid exhaust therefrom, means for shifting said main valve means from one of said positions to the other of said positions, means for maintaining said main valve means in one of said positions including means for substantially constant exhaust of gas flow regardless of pressure variation therein, and control means of siad pressure reducing means when said main valve means are open urging an automatic regulation of fluid flow therethrough, said pressure reducing means including a metering valve sized so that when said first opening means experiences pressure variation said metering valve proportionally varies prevalent flow passages leading to said main valve means for exhaust, said proportionallity between said pressure and said flow achieved through use of a needle inside an orifice of said metering valve controlling closely throttle of gas flown therebetween,
said needle including an elongated taper between a reduced diameter straight stem with and end and an opposite, larger diameter flange which may be skirted,
a metering valve nozzle with an orifice adaptable to receive said stem end with said elongated taper which in operation moves inside said orifice with pressure variation inside cylinder regulated by said valve, including a spring between said needle flange and said orifice providing said biasing force means for said automatic fluid flow regulation, said nozzle also including a flange,
said main valve means including an elongated pin with a head on one end thereof to keep valve closed,
said first valve housing end is provided with a counterbore for housing said metering valve with said nozzle, said second housing end is provided with a central passage therein initiating with a small opening comprising said second opening means of said valve housing serving as fluid exhaust which initiates at said nozzle inside said counterbore, said small opening continuing inwardly from said second housing end toward said first housing end and including a third opening therebetween of a diameter slightly larger than said second opening and slightly smaller than said counterbore, a first shoulder between said first and third openings receiving said flange of said metering valve nozzle while said nozzle facing said first opening, a second shoulder between said second and third openings having said central passage of said second opening to serve as a seat for said head of said elongated pin, a spring in said third opening abutting said head of said elongated pin at one spring end and said stem of said needle entering said third opening slidably for participation in pressure reduction during said valve throttling at the other end, including means for maintaining said main valve means in one of said positions by pressure of compressed gas on said pin head inside said third opeining, said pin protruding said second opening means of said nozzle central passage for shifting said main valve means from said first position blocking fluid communication between said first and second openings to said second position allowing fluid exhaust when said main valve pin is externally depressed, including an automatic valve return to said first position by said gas pressure together with said spring in said third opening as soon as said external pin actuation by depression is discontinued, means for se- curing said valve housing to a boss of a gas cylinder by said first housing end so as to have said skirted flange of said needle resting on a shoulder provided inside said boss during the initial valve assembly thereto with ability to subsequently move axially therefrom toward said counterbore for flow control during the withdrawal of gas through said nozzle and said metering needle valve regardless of pressure variation in said gas cylinder enabling a regulated atmospheric exhaust at constant gas flow therefrom when said pin is depressed.

2. A valve as described in claim 1 wherein said stem end of said needle entering said third opening is slightly less in diameter to said third diameter opening to insure close sliding fit with little clearance for gas flow therethrough.

* * * * *